US009147371B2

(12) United States Patent
Chen et al.

(10) Patent No.: US 9,147,371 B2
(45) Date of Patent: Sep. 29, 2015

(54) LIQUID CRYSTAL DISPLAY PANEL USED IN NORMALLY BLACK MODE AND DISPLAY APPARATUS USING THE SAME

(71) Applicant: Shenzhen China Star Optoelectronics Technology Co., Ltd., Shenzhen (CN)

(72) Inventors: Yin-Hung Chen, Shenzhen (CN); Xia Tian, Shenzhen (CN); Pei Jia, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 13/703,386

(22) PCT Filed: Nov. 23, 2012

(86) PCT No.: PCT/CN2012/085196
§ 371 (c)(1),
(2) Date: Dec. 11, 2012

(87) PCT Pub. No.: WO2014/067198
PCT Pub. Date: May 8, 2014

(65) Prior Publication Data
US 2015/0235605 A1    Aug. 20, 2015

(30) Foreign Application Priority Data
Nov. 5, 2012   (CN) .......................... 2012 1 0436225

(51) Int. Cl.
*G09G 3/36*    (2006.01)
*G09G 5/10*    (2006.01)

(52) U.S. Cl.
CPC ................ *G09G 3/3696* (2013.01); *G09G 5/10* (2013.01); *G09G 2300/04* (2013.01)

(58) Field of Classification Search
CPC .... G09G 3/3696; G09G 5/10; G09G 2300/04
See application file for complete search history.

(56) References Cited

U.S. PATENT DOCUMENTS

2009/0273592 A1* 11/2009 Chien et al. ................... 345/213
2010/0195034 A1    8/2010 Lee et al.
2011/0310335 A1* 12/2011 Hashimoto et al. ............. 349/96
2013/0314840 A1   11/2013 Kang

FOREIGN PATENT DOCUMENTS

CN        102317850 A      1/2012
CN        102581270        9/2012
KR        20100089248 A    8/2010

* cited by examiner

*Primary Examiner* — Ryan A Lubit
(74) *Attorney, Agent, or Firm* — Mark M. Friedman

(57) ABSTRACT

The present invention provides a liquid crystal display (LCD) panel and a display apparatus using the same. The LCD panel comprises a first substrate, a second substrate and a liquid crystal layer. The second substrate comprises pixels, wherein, when images are displayed by the pixels, a voltage difference between a first voltage of the first sub-pixels and a second voltage of the second sub-pixels is inversely proportional to a grayscale of the images displayed by the pixels, and the first voltage is higher than the second voltage. The present invention can mitigate the viewing angle problem of the pixels.

14 Claims, 4 Drawing Sheets

LIQUID CRYSTAL DISPLAY PANEL USED IN NORMALLY BLACK MODE AND DISPLAY APPARATUS USING THE SAME

FIELD OF THE INVENTION

The present invention relates to a field of a liquid crystal display technology, and more particularly to a liquid crystal display (LCD) panel and a display apparatus using the same.

BACKGROUND OF THE INVENTION

Liquid crystal displays (LCDs) have been widely applied in electrical products. Currently, most of LCDs are backlight type LCDs which comprise a liquid crystal panel and a backlight module. The liquid crystal panel is composed of two transparent substrates and a liquid crystal sealed there-between, and the liquid crystal panel has pixels for displaying images.

At present, a vertical alignment (VA) technology has been developed for LCD panels, and has some advantages, such as wide viewing angle, high aperture ratio, high contrast and simple process.

However, when the images of the VA type LCD is viewed from the front or obliquely, the displayed image effects will be different at different viewing angles, and especially in a normally black mode, the viewing angle problem is more prominent, thereby greatly deteriorating a display quality of the LCD.

As a result, it is necessary to provide an LCD panel and a display apparatus using the same to solve the problems existing in the conventional technologies, as described above.

SUMMARY OF THE INVENTION

The present invention provides an LCD panel and a display apparatus using the same to solve the viewing angle problem existing in the conventional LCD.

A primary object of the present invention is to provide a liquid crystal display panel, and the liquid crystal display panel comprises: a first substrate; a second substrate comprising a plurality of pixels, wherein each of the pixels includes a first sub-pixel and a second sub-pixel, and the first sub-pixel includes a plurality of first branch portions, and there is a first space between the first branch portions, and the second sub-pixel includes a plurality of second branch portions, and there is a second space between the second branch portions, and the first space is less than the second space; and a liquid crystal layer thrilled between the first substrate and the second substrate; wherein, when images are displayed by the pixels, a first voltage is applied to the first sub-pixels, and a second voltage is applied to the second sub-pixels, and a voltage difference between the first voltage and the second voltage is inversely proportional to a grayscale of the images displayed by the pixels, and the first voltage is higher than the second voltage.

Another object of the present invention is to provide a display apparatus comprising a backlight module and the above-mentioned LCD panel.

In one embodiment of the present invention, a difference between the first space and the second space is larger than 1 μm.

In one embodiment of the present invention, the difference between the first space and the second space is in a range of 1 μm to 3 μm.

In one embodiment of the present invention, when the brightness of the images displayed by the pixels is lower than the predetermined brightness, a voltage difference between the first voltage and the second voltage is higher than 1 V.

In one embodiment of the present invention when the brightness of the images displayed by the pixels is lower than the predetermined brightness, the voltage difference between the first voltage and the second voltage is in a range of 1 V to 3V.

In one embodiment of the present invention, an area of the second sub-pixel is equal to or larger than an area of the first sub-pixel.

In the LCD panel and the display apparatus using the same of the present invention, with the use of the different branch spaces and the different driving voltages of the different sub-pixels in the pixels, the brightness difference between the different sub-pixels can be enlarged, so as to mitigate the viewing angle problem of the pixels.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
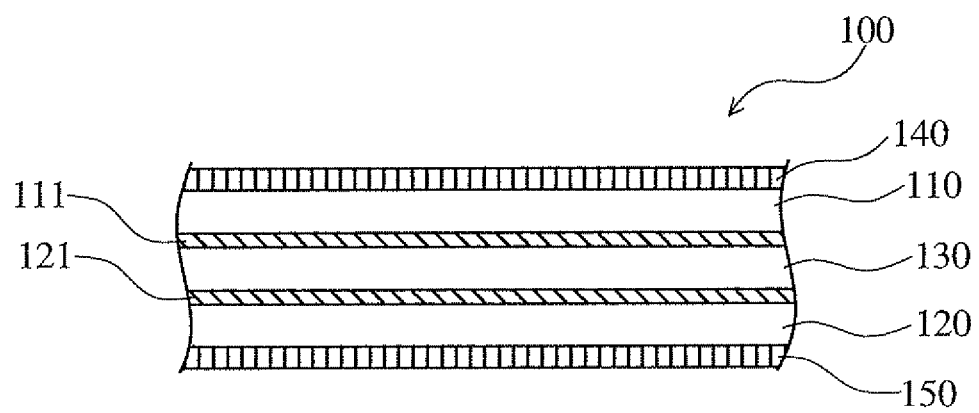
FIG. 1 is a partially cross-sectional view showing a liquid crystal display panel according to one embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

The drawings and description are to be regarded as illustrative in nature and not restrictive. Like reference numerals designate like elements throughout the specification. In addition, the size and thickness of each component shown in the drawings are arbitrarily shown for understanding and ease of description, but the present invention is not limited thereto.

In the drawings, the thickness of layers, films, panels, regions, etc., are exaggerated for clarity. In the drawings, for understanding and ease of description, the thicknesses of some layers and areas are exaggerated. It will be understood that, when an element such as a layer, film, region, or substrate is referred to as being "on" another element, it can be directly on the other element or intervening elements may also be present.

In addition, in the specification, unless explicitly described to the contrary, the word "comprise" and variations such as "comprises" or "comprising" will be understood to imply the inclusion of stated elements but not the exclusion of any other elements. Furthermore, in the specification, "on" implies being positioned above or below a target element and does not imply being necessarily positioned on the top on the basis of a gravity direction.

Referring to FIG. 1, a partially cross-sectional view showing a liquid crystal display (LCD) panel according to one embodiment of the present invention is illustrated. The display apparatus of the present embodiment can comprises the liquid crystal display panel 100 and a backlight module (not shown). The liquid crystal display panel 100 is disposed opposite to the backlight module, and the backlight module may be realized as a side lighting backlight module or a bottom lighting backlight module to provide the liquid crystal display panel 100 with the back-light.

Referring to FIG. 1 again, the liquid crystal display panel 100 may comprise a first substrate 110, a second substrate 120, a liquid crystal layer 130, a first polarizer 140 and a second polarizer 150. The liquid crystal layer 130 is formed between the first substrate 110 and the second substrate 120. That is, the liquid crystal layer 130 is positioned at inner sides of the first substrate 110 and the second substrate 120. The first polarizer 140 is disposed at an outer side of the first substrate 110, and the second polarizer 150 is disposed at an outer side of the second substrate 120.

Referring to FIG. 1, the first substrate 110 and the second substrate 120 may be realized as glass substrates or flexible plastic substrates. The first substrate 110 may be a glass substrate or other material substrate with color filters (CF), and the second substrate 120 may be a glass substrate or other material substrate with a thin film transistor (TFT) array. It notes that the CF and the TFT array may also be disposed on the same substrate in other embodiments.

Referring to FIG. 1 again, the first substrate 110 can comprise a first electrode layer 111, and the second substrate 120 can comprise a second electrode layer 121. The first electrode layer 111 and the second electrode layer 121 are preferably made of a transparent and electrically conductive material, such as ITO, IZO, AZO, GZO, TCO or ZnO. A voltage can be applied to the liquid crystal molecules of the liquid crystal layer 130 by the first electrode layer 111 and the second electrode layer 121. In this embodiment, the first electrode layer 111 may be a common electrode, and the second electrode layer 121 may be a pixel electrode.

Figure 2:
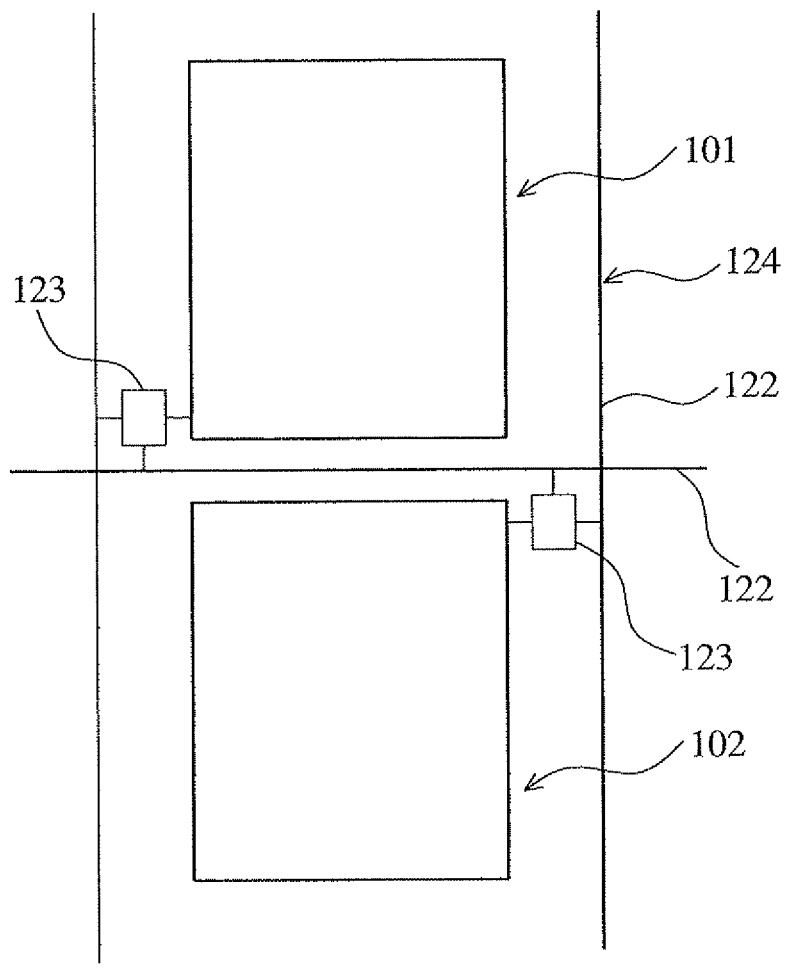
FIG. 2 is a layout view of pixels of the liquid crystal display panel according to one embodiment of the present invention.

Referring to FIG. 2, a layout view of pixels of the liquid crystal display panel according to one embodiment of the present invention is illustrated. The second substrate 120 further comprises a plurality of signal lines 122, a plurality of active elements 123 and a plurality of pixels 124. The signal lines 122 may be gate lines and data lines which are crisscrossed, thereby forming the pixels 124 arranged in an array. The active elements 123 may be thin film transistors (TFTs) disposed in the pixels 124 and electrically connected to the signal lines 122 and pixel electrodes of the pixels 124, respectively. Each of the pixels 124 can corresponds to a color filter, such as a red, green or blue filter.

Figure 3:
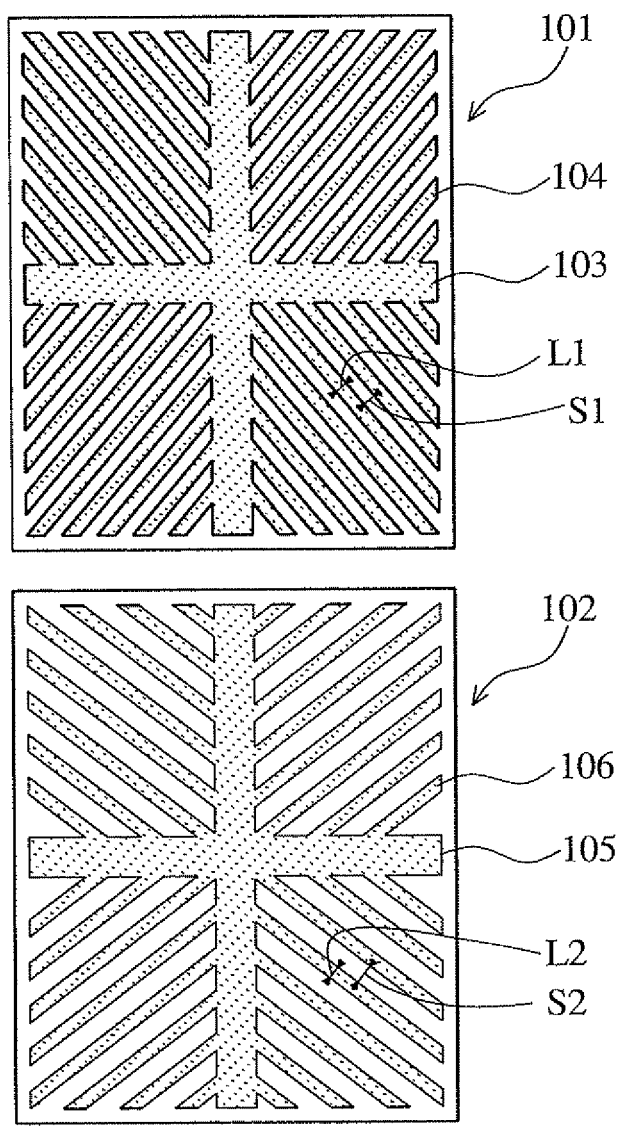
FIG. 3 is a schematic diagram showing one pixel of the LCD panel according to one embodiment of the present invention.

Referring to FIG. 2 and FIG. 3, FIG. 3 is a schematic diagram showing one pixel of the LCD panel according to one embodiment of the present invention. Each of the pixels 124 includes a first sub-pixel 101 and a second sub-pixel 102, wherein an area of the second sub-pixel 102 may be equal to or larger than an area of the first sub-pixel 101. A pixel electrode structure in each of the pixels 124 includes a first trunk portion 103 and a plurality of first branch portions 104. A pixel electrode structure in each of the second sub-pixels 102 includes a second trunk portion 105 and a plurality of second branch portions 106. The first trunk portion 103 and the second trunk portion 105 may be crisscross patterns. The branch portions 104 and 106 obliquely extend from the trunk portions 103, 105, and are arranged parallel to each other. In this case, the first branch portions 104 in each of the pixels 124 have an identical first line width L1 and an identical first space S1 there-between, and the second branch portions 106 in each of the second sub-pixels 102 have a second line width L2 and a second space S2 there-between, and the first space S1 in the first sub-pixels 101 is less than the second space S2 in the second sub-pixels 102 (S1<S2). Herein, the line width indicates a width of each of the branch portions, and the line space indicates a space or distance between each adjacent two of the branch portions.

Figure 4:
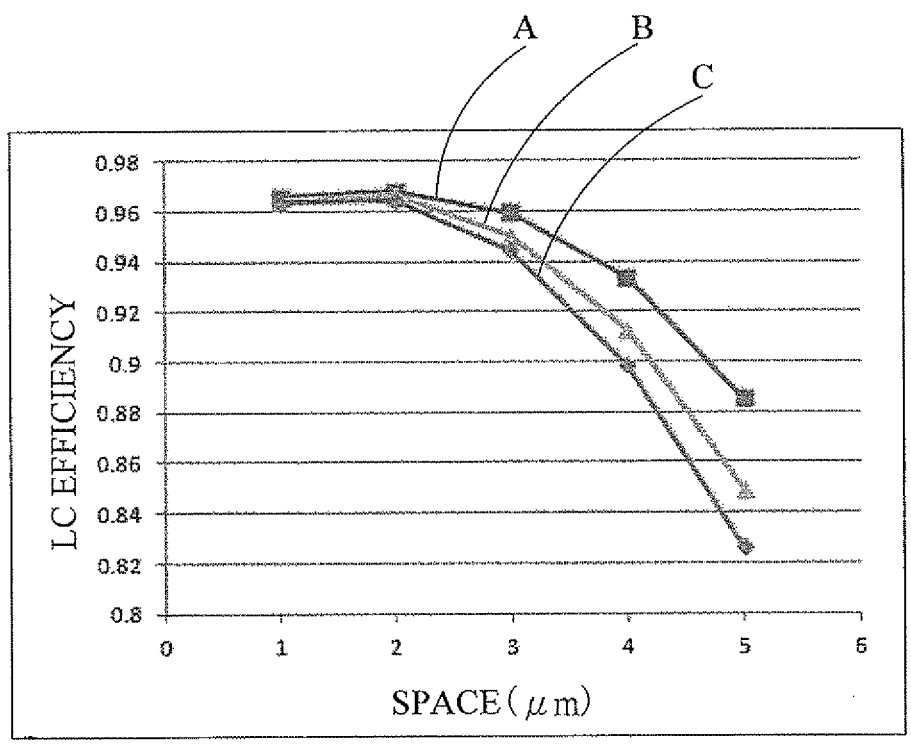
FIG. 4 is a schematic diagram showing a relationship between a line width/space of the branch portions of one pixel and a corresponding LC efficiency of the liquid crystal display panel according to one embodiment of the present invention.

Referring to FIG. 4, FIG. 4 is a schematic diagram showing a relationship between a line width/space of the branch portions of one pixel and a corresponding LC efficiency of the liquid crystal display panel according to one embodiment of the present invention. As shown in FIG. 4, a line A indicates a relationship between different spaces and corresponding LC efficiency when the branch portions have a line width of 1 μm, and a line B indicates a relationship between different spaces and corresponding LC efficiency when the branch portions have a line width of 2 μm, and a line C indicates a relationship between different spaces and corresponding LC efficiency when the branch portions have a line width of 3 μm. Accordingly, as shown in FIG. 4, the larger the space between the branch portions of the pixels is, the lower the LC efficiency is.

When images are displayed by the pixels 124 of the liquid crystal display panel 100, a first voltage V1 is applied to the pixel electrodes of the first sub-pixels 101, and a second voltage V2 is applied to the pixel electrodes of the second sub-pixels 102, and the first voltage V1 is higher than the second voltage V2 (V1>V2). In this case, a voltage difference (V1-V2) between the first voltage V1 and the second voltage V2 is inversely proportional to a grayscale of the images displayed by the pixels 124. Therefore, the lower the grayscale (or brightness) of the images displayed by the pixels 124 is, the larger the voltage difference (V1-V2) between the first sub-pixels 101 and the second sub-pixels 102 is. On the contrary, the higher the grayscale (or brightness) of the images displayed by the pixels 124 is, the less the voltage difference (V1-V2) between the first sub-pixels 101 and the second sub-pixels 102 is.

Therefore, in a normally black mode, when the images displayed by the pixels 124 have a low brightness (or grayscale), the voltage difference (V1-V2) between the first sub-pixels 101 and the second sub-pixels 102 in the pixels 124 can be getting larger, so as to enlarge a brightness difference between the first sub-pixels 101 and the second sub-pixels 102 for mitigating the viewing angle problem, as well as improving the display quality thereof. Herein, the viewing angle problem means that the displayed image effects differ between when the display is viewed from the front and when display is viewed obliquely.

Furthermore, the first space S1 in the first sub-pixels 101 can be less than the second space S2 in the second sub-pixels 102 (S1<S2), and thus an LC efficiency of the first sub-pixels 101 can be higher than an LC efficiency of the second sub-pixels 102. In other words, a display brightness of the first sub-pixels 101 can he higher than a display brightness of the second sub-pixels 102. Therefore, with the use of the different electrode spaces in the different sub-pixels of the pixels 124, the brightness difference between the first sub-pixels 101 and the second sub-pixels 102 can be further enlarged for further mitigating the viewing angle problem of the pixels.

In one embodiment, the space S1 or S2 between the first branch portions 104 or the second branch portions 106 may be less than 7 um, such as in the range of 1 um to 7 um, and a difference (S1-S2) between the first space S1 and the second space S2 may be larger than 1 um, such as in the range of 1 um to 3 um, so as to mitigate the viewing angle problem of the pixels.

In one embodiment, when the images displayed by the pixels 124 have a low brightness (or grayscale), i.e. the brightness of the images displayed by the pixels 124 is lower than a predetermined, brightness, the voltage difference (V1−V2) between the first sub-pixels 101 and the second sub-pixels 102 can he larger than 1V, such as in the range of 1V to 3V, so as to mitigate the viewing angle problem of the pixels.

As described above, in the LCD panel and the display apparatus of the present invention using the same, when the images displayed by the pixels have a low brightness (or grayscale), with the use of the different branch spaces and the different driving voltages of the different sub-pixels in the pixels, the brightness difference between the different sub-pixels can be enlarged, so as to mitigate the viewing angle problem of the pixels.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A liquid crystal display panel used in normally black mode, comprising:
a first substrate;
a second substrate comprising a plurality of pixels, wherein each of the pixels includes a first sub-pixel and a second sub-pixel, and the first sub-pixel includes a plurality of first branch portions, and there is a first space between the first branch portions, and the second sub-pixel includes a plurality of second branch portions, and there is a second space between the second branch portions, and the first space is less than the second space, and a difference between the first space and the second space is either larger than or equal to 1 um; and
a liquid crystal layer formed between the first substrate and the second substrate;
wherein, when images are displayed by the pixels, a first voltage is applied to the first sub-pixels, and a second voltage is applied to the second sub-pixels, and a voltage difference between the first voltage and the second voltage is inversely proportional to a grayscale of the images displayed by the pixels, and the first voltage is higher than the second voltage;
wherein, when the brightness of the images displayed by the pixels is lower than a predetermined brightness, a voltage difference between the first voltage and the second voltage is either higher than or equal to 1 V.

2. The liquid crystal display panel according to claim 1, wherein the difference between the first space and the second space is in a range of 1 um to 3 um.

3. The liquid crystal display panel according to claim 1, wherein, when the brightness of the images displayed by the pixels is lower than the predetermined brightness, the voltage difference between the first voltage and the second voltage is in a range of 1 V to 3V.

4. The liquid crystal display panel according to claim 1, wherein an area of the second sub-pixel is equal to or larger than an area of the first sub-pixel.

5. A liquid crystal display panel used in normally black mode, comprising:
a first substrate;
a second substrate comprising a plurality of pixels, wherein each of the pixels includes a first sub-pixel and a second sub-pixel, and the first sub-pixel includes a plurality of first branch portions, and there is a first space between the first branch portions, and the second sub-pixel includes a plurality of second branch portions, and there is a second space between the second branch portions, and the first space is less than the second space; and
a liquid crystal layer formed between the first substrate and the second substrate;
wherein, when images are displayed by the pixels, a first voltage is applied to the first sub-pixels, and a second voltage is applied to the second sub-pixels, and a voltage difference between the first voltage and the second voltage is inversely proportional to a grayscale of the images displayed by the pixels, and the first voltage is higher than the second voltage;
wherein, when the brightness of the images displayed by the pixels is lower than a predetermined brightness, a voltage difference between the first voltage and the second voltage is either higher than or equal to 1 V.

6. The liquid crystal display panel according to claim 5, wherein a difference between the first space and the second space is either larger than or equal to 1 um.

7. The liquid crystal display panel according to claim 6, wherein the difference between the first space and the second space is in a range of 1 um to 3 um.

8. The liquid crystal display panel according to claim 5, wherein, when the brightness of the images displayed by the pixels is lower than the predetermined brightness, the voltage difference between the first voltage and the second voltage is in a range of 1 V to 3V.

9. The liquid crystal display panel according to claim 5, wherein an area of the second sub-pixel is equal to or larger than an area of the first sub-pixel.

10. A display apparatus comprising:
a backlight module; and
a liquid crystal display panel comprising:
a first substrate;
a second substrate comprising a plurality of pixels, wherein each of the pixels includes a first sub-pixel and a second sub-pixel and the first sub-pixel includes a plurality of first branch portions, and there is a first space between the first branch portions, and the second sub-pixel includes a plurality of second branch portions, and there is a second space between the second branch portions, and the first space is less than the second space; and
a liquid crystal layer formed between the first substrate and the second substrate;
wherein, when images are displayed by the pixels, a first voltage is applied to the first sub-pixels, and a second voltage is applied to the second sub-pixels, and a voltage difference between the first voltage and the second voltage is inversely proportional to a grayscale of the images displayed by the pixels, and the first voltage is higher than the second voltage;
wherein, when the brightness of the images displayed by the pixels is lower than a predetermined brightness, a voltage difference between the first voltage and the second voltage is either higher than or equal to 1 V.

11. The display apparatus according to claim 10, wherein a difference between the first space and the second space is either larger than or equal to 1 um.

12. The display apparatus according to claim 11, wherein the difference between the first space and the second space is in a range of 1 um to 3 um.

13. The display apparatus according to claim 10, wherein, when the brightness of the images displayed by the pixels is lower than the predetermined brightness, the voltage difference between the first voltage and the second voltage is in a range of 1 V to 3V.

14. The display apparatus according to claim 10, wherein an area of the second sub-pixel is equal to or larger than an area of the first sub-pixel.

\* \* \* \* \*